_US006813557B2_

United States Patent
Schmidt et al.

(10) Patent No.: US 6,813,557 B2
(45) Date of Patent: Nov. 2, 2004

(54) METHOD AND SYSTEM FOR CONTROLLING A VEHICLE HAVING MULTIPLE CONTROL MODES

(75) Inventors: Mark Alvin Schmidt, Charlotte, NC (US); Kenneth E. Hunt, Oconomowoc, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/400,764

(22) Filed: Mar. 27, 2003

(65) Prior Publication Data

US 2004/0193363 A1 Sep. 30, 2004

(51) Int. Cl.$^7$ .............................. G06G 7/00; G06F 7/00
(52) U.S. Cl. ..................... 701/200; 701/23; 701/301; 348/335
(58) Field of Search .................. 701/200, 36, 213, 701/23, 26, 28, 301; 348/92, 207.99, 335, 149; 340/988, 435, 436, 825.69; 180/168; 56/10.2 R (56) References Cited

U.S. PATENT DOCUMENTS

| | | | |
|---|---|---|---|
| 4,515,221 A | 5/1985 | Van der Lely | 172/3 |
| 5,369,347 A | 11/1994 | Yoo | 318/588 |
| 5,610,815 A | 3/1997 | Gudat et al. | 384/424.027 |
| 5,612,883 A | 3/1997 | Shaffer et al. | 364/460 |
| 5,758,298 A * | 5/1998 | Guldner | 701/23 |
| 5,841,259 A | 11/1998 | Kim et al. | 318/587 |
| 5,906,645 A | 5/1999 | Kagawa et al. | 701/23 |
| 5,938,704 A * | 8/1999 | Torii | 701/23 |
| 5,974,348 A * | 10/1999 | Rocks | 701/28 |
| 6,112,143 A * | 8/2000 | Allen et al. | 701/25 |
| 6,255,793 B1 | 7/2001 | Peless et al. | 318/580 |
| 6,417,641 B2 | 7/2002 | Peless et al. | 318/580 |
| 6,445,983 B1 | 9/2002 | Dickson et al. | 701/23 |
| 6,463,374 B1 * | 10/2002 | Keller et al. | 701/50 |
| 6,539,294 B1 * | 3/2003 | Kageyama | 701/23 |
| 2002/0049522 A1 * | 4/2002 | Ruffner | 701/23 |
| 2002/0104300 A1 | 8/2002 | Hunt | 56/10.6 |

FOREIGN PATENT DOCUMENTS

JP          09 128044          11/1995

OTHER PUBLICATIONS

T. Pliarski, M. Happold, H. Pangels, M. Ollis, K. Fitzpatrick, and A. Stentz, "The Demeter System for Automated Harvesting," Proceedings of the 8$^{th}$ International Topical Meeting on Robotics and Remote Systems, Apr., 1999.

\* cited by examiner

Primary Examiner—Thomas G. Black
Assistant Examiner—Tuan C To (57) ABSTRACT

A method and system for controlling a vehicle comprises planning a path of a vehicle based on operator input. In a first mode, the vehicle may be guided based on the planned path. In a second mode, an operator of the vehicle commands or activates at least one of a propulsion system, a braking system, a steering system, and an implement system of the vehicle to guide the vehicle. In a third mode, the presence of an obstacle is detected, where the obstacle obstructs the planned path of the vehicle. The vehicle is guided in a third mode based upon the planned path and the detection of the presence of the obstacle. At least one of said first mode, second mode, and third mode is selected based upon the operator input.

24 Claims, 5 Drawing Sheets

METHOD AND SYSTEM FOR CONTROLLING A VEHICLE HAVING MULTIPLE CONTROL MODES

FIELD OF THE INVENTION

This invention relates to a method and system for controlling a vehicle having multiple control modes.

BACKGROUND OF THE INVENTION

In the past, control systems were typically designed for manned operation of a vehicle. Manned operation of a vehicle has several drawbacks including one or more of the following: labor costs of drivers, accidents caused by inattentive, intoxicated or otherwise impaired drivers, and inaccuracies in execution of work tasks caused by variance between drivers, human limitations or other human factors. If a vehicle is configured for unmanned operation, the above drawbacks can be addressed, at least to the extent that cost and technical complexity of the vehicle does not prevent an unmanned vehicular control system from being economically practical. However, the driver or user may seek the option of supervising the unmanned operation of the vehicle as a matter of consumer preference, for work task flexibility, safety compliance or for other reasons. Accordingly, a need exists for a vehicle that may operate in a manned mode and a supervised unmanned mode.

SUMMARY OF THE INVENTION

In accordance with the invention, a method and system for controlling a vehicle comprises planning a path of a vehicle based on operator input. In a first mode, the vehicle may be guided based on the planned path. In a second mode, an operator of the vehicle commands or activates at least one of a propulsion system, a braking system, a steering system, and an implement system of the vehicle to guide the vehicle. In a third mode, the presence of an obstacle is detected, where the obstacle obstructs the planned path of the vehicle. The vehicle is guided in a third mode based upon the planned path and the detection of the presence of the obstacle. At least one of said first mode, second mode, and third mode is selected based upon the operator input.

DESCRIPTION OF THE PREFERRED EMBODIMENT

Figure 1:
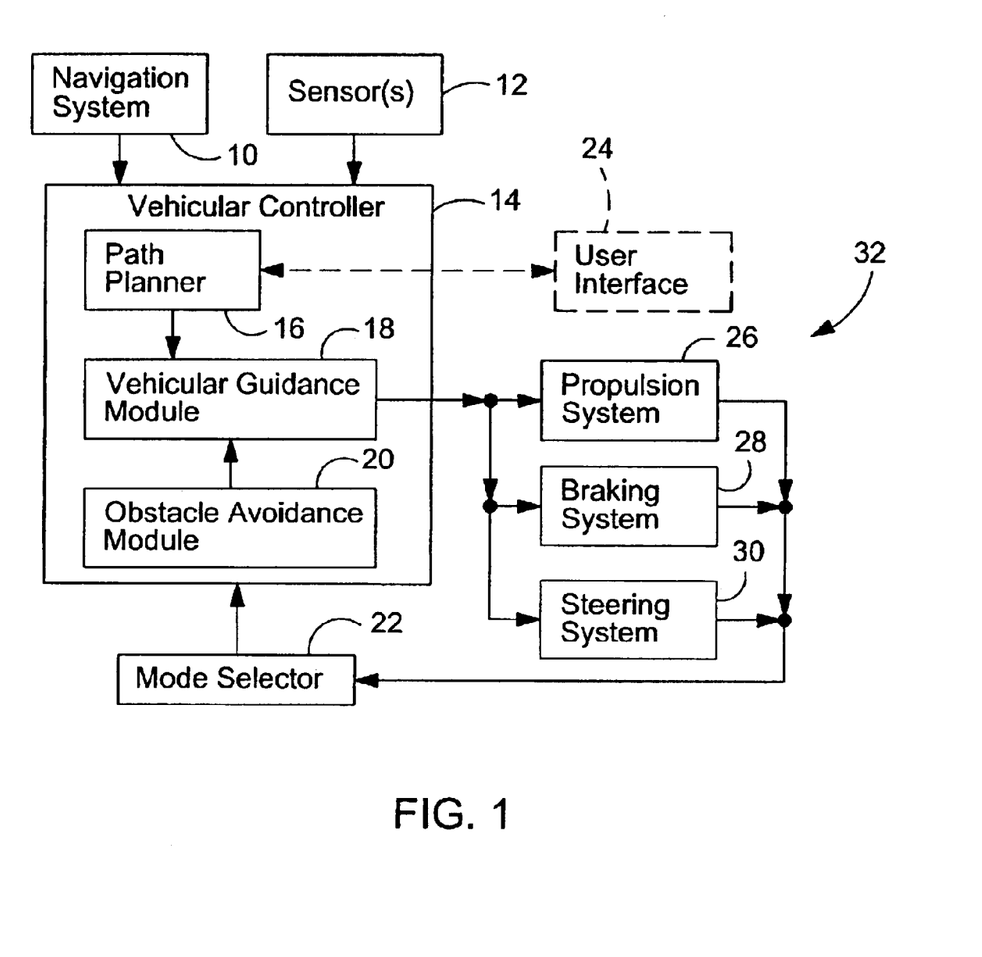
FIG. 1 is a block diagram of a system for controlling a vehicle in accordance with multiple control modes.

In accordance with one embodiment of the invention, FIG. 1 shows a block diagram of a system for controlling a vehicle, such as a mower, a stadium mower or another work vehicle. A vehicular controller 14 is coupled to a navigation system 10 and one or more sensors 12. The vehicular controller 14 is associated with a mode selector 22 for selection of one or more modes of operation of the vehicle. The vehicular controller 14 may communicate with a propulsion system 26, a braking system 28 or a steering system 30.

The navigation system 10 obtains a geographic position of the vehicle with respect to a work area for the vehicle.

The vehicular controller 14 comprises a path planner 16, a vehicular guidance module 18, and an obstacle detection/avoidance module 20. The path planner 16 is capable of planning a path of a vehicle based on operator input via a user interface 24. The user interface 24 may comprise one or more of the following: a keypad, a keyboard, a display, a pointing device (e.g., a mouse), and a graphical user interface 24.

The vehicular guidance module 18 guides the vehicle in a first mode based on the planned path. The vehicular guidance module 18 facilitates operation of the vehicle in a second mode, distinct from the first mode, where an operator of the vehicle commands or activates at least one of a propulsion system 26, a braking system 28, a steering system 30, and an implement system 72 of the vehicle. The vehicular guidance module 18 is adapted to guide the vehicle in a third mode based upon the planned path and the detection of the presence of the obstacle.

One or more sensor(s) is/are used for detecting the presence of an obstacle that obstructs the planned path of the vehicle if the vehicle is operating in a third mode, mutually exclusive to the first mode and the second mode.

The mode selector 22 supports the selection of at least one of said first mode, second mode, and third mode based upon the operator input. The mode selector 22 is arranged to automatically switch from the first mode to the second mode in response to the operator operating at least one of the propulsion system 26, the braking system 28, the steering system 30, and the implement system 72 during the operation of the vehicle in the first mode. The first mode comprises an automatic steering mode, the second mode comprises a manual operator-driven mode, and the third mode comprises an autonomous mode. An autonomous mode is where the vehicle has sensors 12 and control systems that allow the vehicle to complete a predefined mission and to deviate from the mission to provide for safety compliance and acceptable interaction with the environment of the vehicle.

Figure 2:
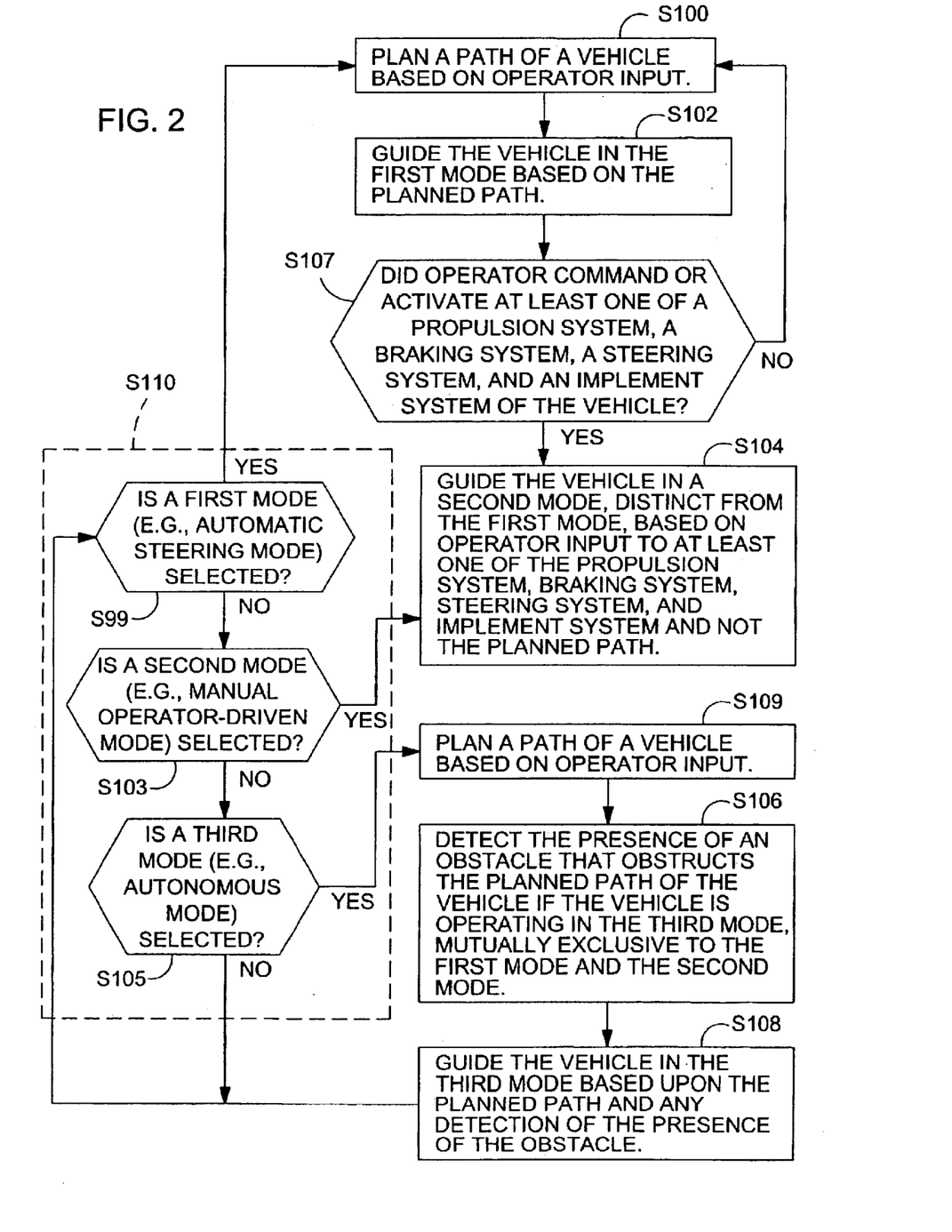
FIG. 2 is a flow chart of a method for controlling the vehicle in accordance with multiple control modes.

FIG. 2 is a flow chart of a method for controlling a vehicle. The method of FIG. 2 begins in step S110.

In step S110, a mode selector 22 facilitates an operator selecting at least one of said first mode, second mode, and third mode based upon the operator input. Only one mode can be selected at a time. In one illustrative embodiment, the first mode comprises an automatic steering mode or another supervisory mode in which the operator of the vehicle supervises the vehicle's automatic or semi-autonomous functionality; the second mode comprises a manual operator-driven mode in which the operator mans the vehicle to control the propulsion system 26, the braking system 28, and the steering system 30; the third mode represents an autonomous mode in which an operator does not need to, but may elect to, provide supervisory control over the vehicle.

Step S110 may be represented collectively by decision blocks S99, S103, and S105. In decision block S99, a mode selector 22 or a vehicle controller 14 determines if a first mode is selected. If a first mode is selected, the method continues with step S100. However, if the first mode is not selected, the method continues with decision block S103. In decision block S103, the mode selector 22 or the vehicular controller 14 determines if a second mode is selected. If the second mode is selected, the method continues with step S104. However, if the second mode is not selected, the method continues with decision block S105. In decision block S105, the mode selector 22 or the vehicular controller 14 determines if the third mode is selected. If the third mode is selected, the method continues with step S109. However, if the third mode is not selected, the method continues with decision block S99. Although decision blocks S99, S103, and S105 appear in a certain order in FIG. 2, in an alternate embodiment, decision blocks S99, S103 and S105 may be rearranged in any other sequence.

In step S100, which may follow design block S99 where the first mode is selected, a path planner 16 plans a path of a vehicle based on operator input in accordance with the first mode. For example, via the user interface 24, a user may select a preferential path plan from a library of pre-set, pre-defined or preprogrammed plans. Alternately, via the user interface 24, a user may enter a desired custom path plan based upon user preference or selections of a menu driven path planning tool. In one configuration, the path planner 16 via the user interface 24 supports selection of a series of substantially parallel rows within a work area, wherein at least one of the rows is generally parallel to an outer generally linear boundary of the work area. In another configuration, the path planner 16, via the user interface 24, supports selection of a series of substantially parallel curved rows within a work area, wherein at least one of the curved rows is generally parallel to an outer generally curved boundary of the work area.

In step S102, the vehicular guidance module 18 guides the vehicle in a first mode based on the planned path. The first mode may comprise an automatic steering mode of operation. The vehicular guidance module 18 may guide the vehicle based upon positional data or location data outputted by the navigation system 10. In one embodiment, the navigation system 10 obtains a geographic position of the vehicle with respect to a work area for the vehicle by estimating the time of arrival, angle of arrival, or both, for electromagnetic signals propagating from at least three active beacons or passive reflectors having corresponding unique beacon identifiers coded via said electromagnetic signals. The electromagnetic signals may comprise at least one of a radio frequency signal, an infra-red frequency signal, and an optical signal.

In step S107, the mode selector 22 determines if the operator commands or operates at least one of a propulsion system 26, a braking system 28, a steering system 30, and an implement system 72 of the vehicle. If the operator commands or operates at least one of a propulsion system 26, a braking system 28, a steering system 30, and an implement system of the vehicle, the method continues with step S104. However, if the operator does not command or operate at least one of a propulsion system 26, a braking system 28, a steering system 30, and an implement system of the vehicle, the method continues with step S100.

In step S104, the vehicular guidance module 18 guides the vehicle in a second mode, distinct from the first mode. The second mode may comprise a manual mode, a manned mode, or a manual, operator-driven mode of the vehicle where an operator of the vehicle commands or activates at least one of a propulsion system 26, a braking system 28, a steering system 30, and an implement system 72 of the vehicle. In step S104, the planned path does not control any of the propulsion system 26, a braking system 28, a steering system 30, and an implement system 72 of the vehicle.

Step S104 may occur after step S107 or after step S103, depending upon the activity of an operator of the vehicle or the interaction of the operator with the vehicle. The mode selector 22 may operate in accordance with several alternate configurations associated with step S104. In accordance with one configuration, the mode selector 22 may support a transition or change from the first mode to the second mode in response to an operator activating a switch to change from the first mode to the second mode. In accordance with another configuration, the mode selector 22 facilitates automatically switching from the first mode to the second mode in response to the operator operating at least one of the propulsion system 26, the braking system 28, the steering system 30, and the implement system 72 during the operation of the vehicle in the first mode.

In step S109, which may follow step S105 where the third mode is selected, a path planner 16 facilitates planning of a path of the vehicle based on operator input. The path planning of step S109 is similar to the path planning of step S100, except the path planning of step S109 occurs in conjunction with the third mode, as opposed to the first mode. The third mode comprises an autonomous mode of the vehicle.

In step S106, sensors 12 and an obstacle detection/avoidance module 20 detects the presence of an obstacle that obstructs the planned path of the vehicle if the vehicle is operating in a third mode, mutually exclusive to the first mode and the second mode.

In step S108, the vehicular controller 14 or the vehicular guidance module 18 guides the vehicle in a third mode based upon the planned path and the detection of the presence of any obstacle. Whether an obstacle exists depends upon the facts and circumstances peculiar to any particular work area in which the vehicle is operated.

In an alternate embodiment of step S108, the operator may be given supervisory authority over the third mode via a wireless remote controller, rather than relying solely on the planned path of the path planner 16 and obstacle avoidance module 20 to control the vehicle. For example, a remote controller is associated with a transmitter for transmitting an electromagnetic signal (e.g., a radio-frequency signal) to a receiver that is coupled to the vehicular controller 14. The operator may enter a stop input (e.g., press a button) of the remote controller to transmit a stop signal or stop code to the vehicular controller 14, which in turn activates the braking system 28 to stop movement of the vehicle and/or turn off the vehicle without needing to physically access or approach the vehicle on foot. After step S108, the method may continue with step S110, where a change in mode selection is periodically monitored or continuously monitored, consistent with desired technical performance standards.

Figures 3, 4:
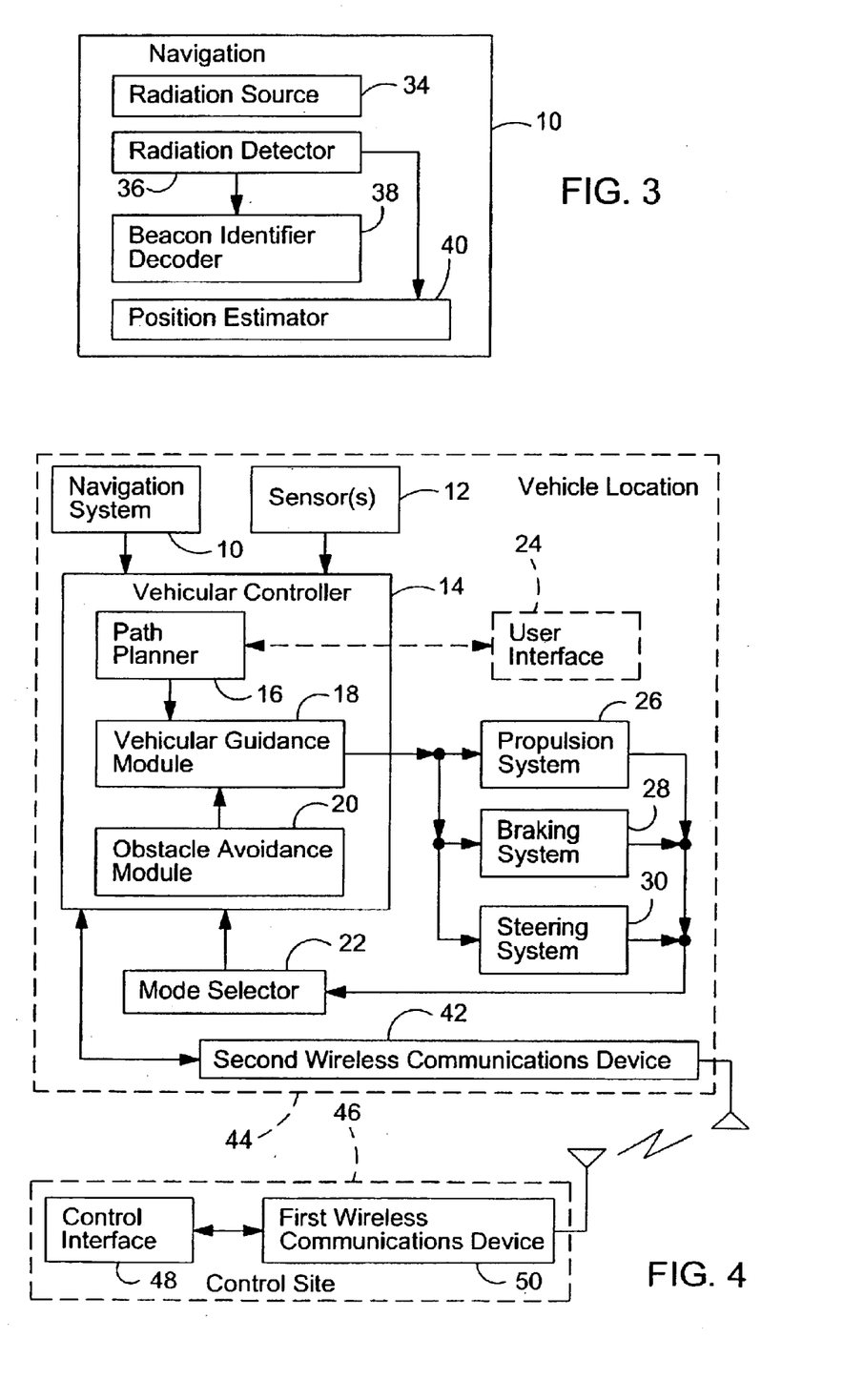
FIG. 3 is a block diagram of a navigation system in greater detail than FIG. 1.
FIG. 4 is a block diagram of an alternate embodiment of the system for controlling a vehicle in which the vehicle may be remotely controlled via wireless communication.

FIG. 3 illustrates the navigation system 10 in greater detail than FIG. 1. The navigation system 10 comprises a radiation source 34, a radiation detector 36, a beacon identifier decoder 38, and a position estimator 40. The radiation source 34 transmits or emits electromagnetic radiation (e.g., radio frequency, optical or infrared signals). The radiation detector 36 detects one or more of the following: reflections of the transmitted radiation signals received at the radiation detector 36, amplified reflections of the transmitted radiation signals received at the radiation detector 36, and a beacon signal transmitted by an active beacon and received at the radiation detector 36. The navigation system 10 estimates the time of arrival of electromagnetic signals from at least three active beacons or passive reflectors having corresponding unique beacon identifiers coded via said electromagnetic signals. The electromagnetic signals comprise at least one of a radio frequency signal, an infra-red frequency signal, and an optical signal.

FIG. 4 shows comprises a vehicular control system that is similar to the vehicular control system of FIG. 1, except the vehicular control system of FIG. 4 further includes provisions for remote control and monitoring of the vehicle by an operator. Like reference numbers in FIG. 1 and FIG. 4 indicate like elements.

The vehicular control system of FIG. 4 includes a first wireless communications device 50 coupled to a control interface 48 at a control site 46 or observation site where an operator of the vehicle is located. In addition, the vehicular control system of FIG. 4 includes a second wireless communications device 42 at a vehicle location 44 where the vehicle is located. The second wireless communication supports communication with the first wireless communications device 50 to provide one-way or bi-directional communications. The control site 46 or observation site is preferably selected, but need not be selected, to permit unobstructed line-of-site observation of the vehicle, for example.

Figure 5:
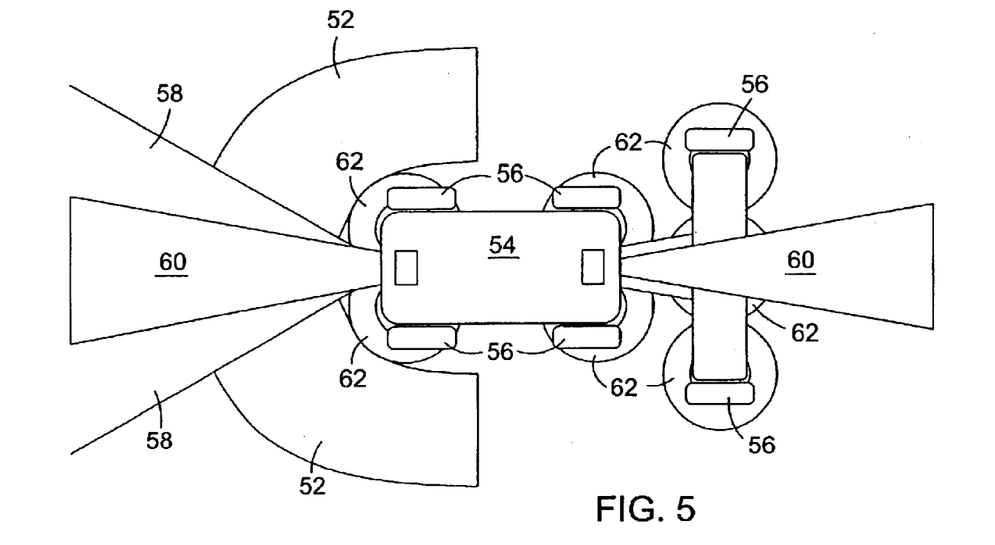
FIG. 5 is a an illustrative diagram of an exemplary suite of sensors of the vehicle in greater detail than FIG. 1.

FIG. 5 illustrates one possible configuration of sensors 12 for the vehicle 54 with movers 56 (e.g., wheels and tires). The sensors 12 may include one or more of the following: a stereo vision sensor, a first visual camera, a second visual camera, ultrasonic obstacle detector, Light Detection and Ranging (LIDAR), a location-determining receiver, a Global Positioning System (GPS) receiver, a GPS receiver with differential correction, a proximity sensor, and a contact sensor. LIDAR may be used to measure distance between the vehicle and an object, the speed of an object relative to the vehicle or ground or the chemical composition of an object.

FIG. 5 shows the radiation zone, reception zone, or both, for corresponding sensors 12. The stereo vision sensor has a respective stereo vision zone 58. The first visual camera operates within a first visual zone 60; the second visual camera operates within a second visual zone 61. The LIDAR operates within a LIDAR zone, which may be generally hemispherical, conical or semi-conical. The proximity sensors operate with proximity zones 62. Each proximity zone 62 may be generally torroidal, generally cylindrical or otherwise shaped.

In one illustrative configuration, the stereo vision sensor is aimed frontward in a direction of movement of the vehicle to view a stereo vision viewing zone; the first visual camera faces frontward in a direction of movement of the vehicle to overlap with the stereo viewing zone; and the second visual camera faces rearward and opposite the direction of movement of the vehicle.

The ultrasonic obstacle detector comprises a transmitter and a detector. The transmitter transmits an ultrasonic signal within a radius about the front of the vehicle. The detector identifies an obstacle within the radius based on the reception of one or more reflections of the ultrasonic signal by an array of antenna elements mounted on the vehicle. A proximity sensor (e.g., a contact sensor) may be mounted about a periphery of the vehicle and any implement attached thereto. The proximity sensor identifies an obstacle that is within a certain range or zone with respect to the vehicle. In one embodiment, the ultrasonic obstacle detector and the proximity sensor are both used for a vehicle to provide redundant or robust obstacle detection. For example, the ultrasonic detector and the proximity sensor may be coupled to a logic circuit or a logic instructions that apply an "OR" logical function to a first output of the ultrasonic detector and a second output of a proximity sensor. Accordingly, if either the ultrasonic detector or the proximity sensor, or both, detect an obstacle, an obstacle detected signal or datum may be communicated with the vehicular guidance module 18.

In an alternate embodiment, the navigation system 10 comprises a global positioning receiver with differential correction to determine a local position of the vehicle within a work area.

Figure 6:
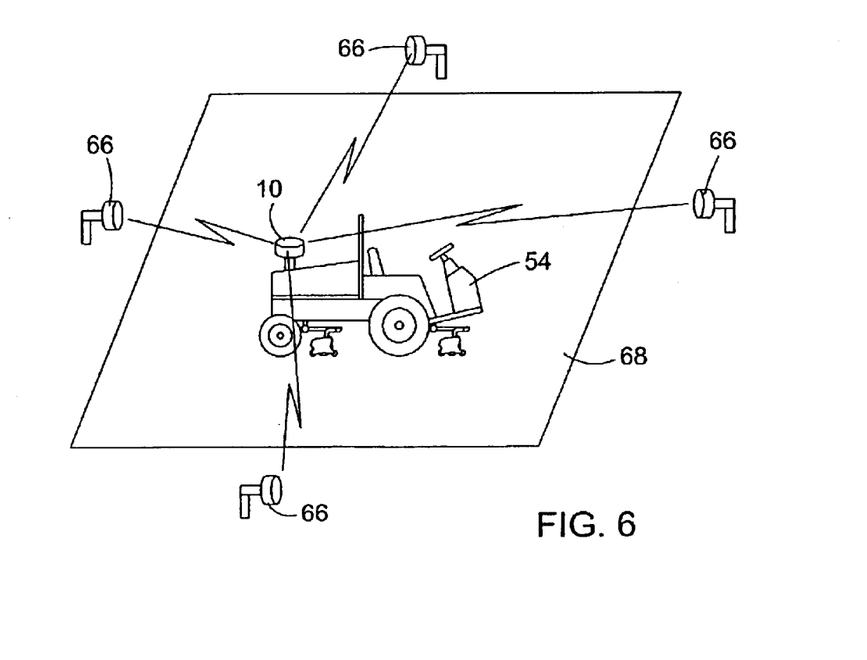
FIG. 6 is a diagram that illustrates operation of an illustrative embodiment of the navigation system.

FIG. 6 illustrates the vehicle in the work area. The area around the work area or about the periphery of the work area 68 is used for mounting one or more beacons selected from the group consisting of active beacons 66, repeater beacons, transmitter beacons, passive reflectors, and passive beacons. Active beacons 66 are beacons that transmit, repeat, or otherwise broadcast through amplification circuitry, a signal to a receiver or transceiver mounted on the vehicle 54. Repeater beacons are active beacons that receive a received signal, amplify the received signal, and retransmit the received signal for reception by a receiver or transceiver mounted on the vehicle 54. Passive reflectors represent electromagnetically reflective members that are arranged to reflect a transmitted signal transmitted by a transmitter mounted on the vehicle 54. Although four active beacons 66 are shown as transmitting signals to a receiver mounted on the vehicle 54 in FIG. 6, any number of beacons, such as active beacons greater than three, may be used to carry out the navigation determination of location data for the vehicle at least within the work area 68. In one embodiment, the location data for the vehicle is updated at a rate of greater than, or equal to, ten hertz to provide location data for proper guidance of the vehicle 54.

Figure 7:
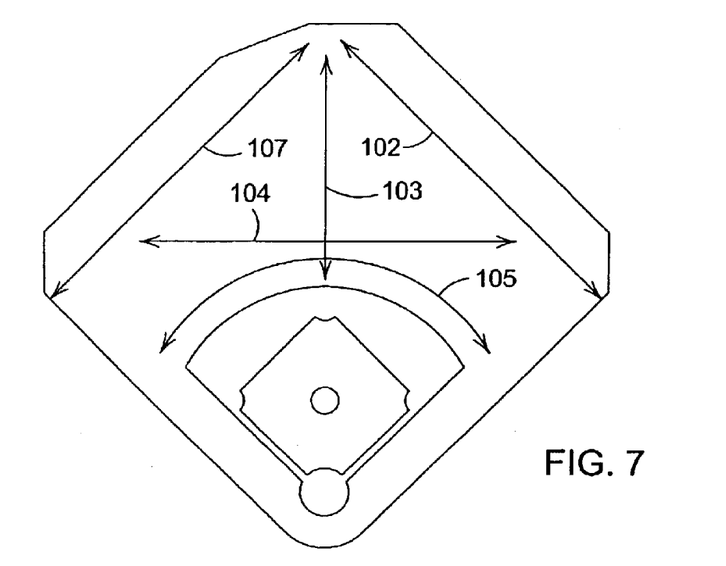
FIG. 7 is a plan view of a work area that shows various alternate planned paths of the vehicle within the work area.

FIG. 7 shows various illustrative path plans, including a first path plan 101, a second path plan 102, a third path plan 103, a fourth path plan 104, and a fifth path plan 105. The path plans of FIG. 7 may be classified into three main categories. Under a first category, the path planning comprises selecting a series of substantially parallel rows within a work area, wherein at least one of the rows is generally parallel to an outer generally linear boundary of the work area. Under a second category, the path planning comprises selecting a series of substantially parallel curved rows within a work area, wherein at least one of the curved rows is generally parallel to an outer generally curved boundary of the work area. Under a third category, the path planning comprises selecting a series of substantially parallel rows, wherein at least one of the rows is generally coextensive or parallel to a linear path referenced to an external reference (e.g., due North-South or East-West) independent of the shape or extent of boundaries, perimeter or periphery of the work area. The first category includes the first path plan 101 and the second path plan 102. The second category includes the fifth path plan 105. The third category includes the third path plan 103 and the fourth path plan 104.

Figure 8:
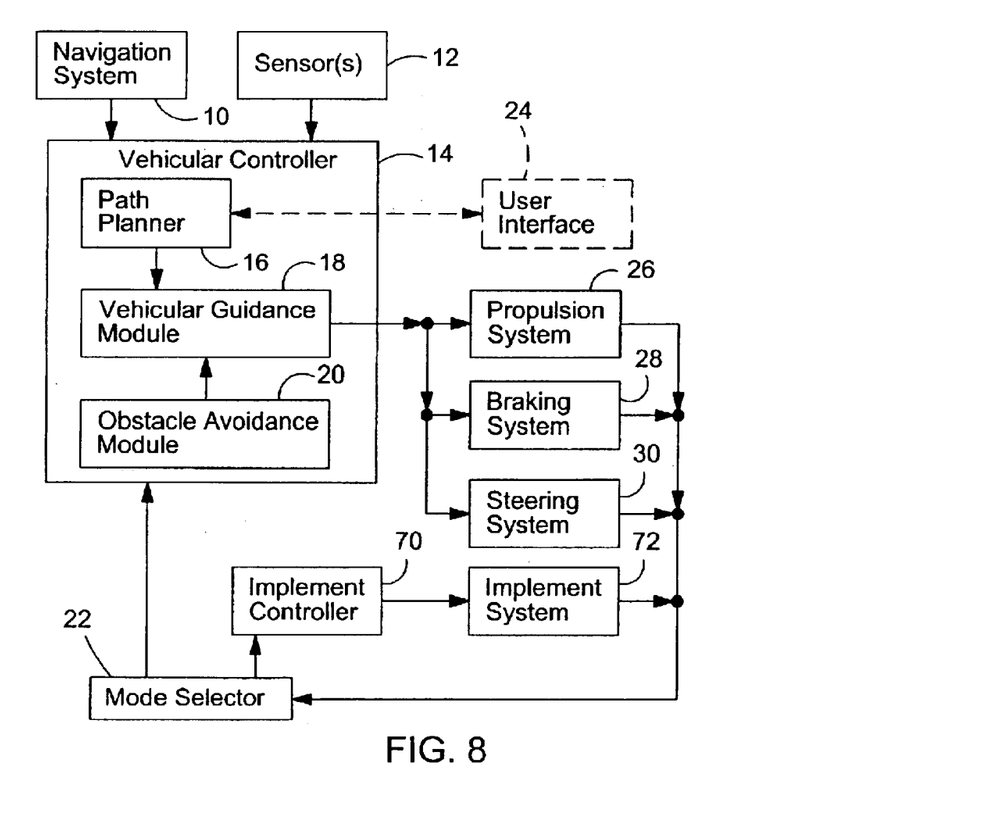
FIG. 8 is a block diagram that shows an alternate embodiment of a system for controlling a vehicle in accordance with the inventor.

FIG. 8 shows a vehicular control system that is similar to the vehicular control system of FIG. 1, except the vehicular control system of FIG. 8 further includes an implement controller 70 and an implement system 72. Like reference numbers in FIG. 1 and FIG. 8 indicate like elements.

The implement controller 70 communicates with an implement system 72 to control whether or not the one or more implements or features thereof are active, inactive, disabled, enabled or otherwise controlled or monitored. The implement system 72 may comprise a mower, cutting blades or another work member associated with the vehicle.

Having described the preferred embodiment, it will become apparent that various modifications can be made without departing from the scope of the invention as defined in the accompanying claims.

What is claimed is:

1. A method of controlling a vehicle comprising:
   planning a path of a vehicle based on operator input;
   guiding the vehicle in a first mode based on the planned path;
   guiding the vehicle in a second mode, distinct from the first mode, where an operator of the vehicle commands or activates at least one of a propulsion system, a braking system, a steering system, and an implement system of the vehicle;
   detecting the presence of an obstacle that obstructs the planned path of the vehicle if the vehicle is operating in a third mode, mutually exclusive to the first mode and the second mode;
   guiding the vehicle in a third mode based upon the planned path and the detection of the presence of the obstacle; and
   selecting at least one of said first mode, second mode, and third mode based upon the operator input.

2. The method according to claim 1 wherein the first mode comprises an automatic steering mode, the second mode comprises a manual operator-driven mode, and the third mode comprises an autonomous mode.

3. The method according to claim 1 further comprising:
   automatically switching from the first mode to the second mode in response to the operator operating at least one of the propulsion system, the braking system, the steering system, and the implement system during the operation of the vehicle in the first mode.

4. The method according to claim 1 further comprising:
   obtaining a geographic position of the vehicle with respect to a work area for the vehicle by estimating the time of arrival of electromagnetic signals from at least three active beacons having corresponding unique beacon identifiers coded via said electromagnetic signals.

5. The method according to claim 4 wherein the electromagnetic signals comprise at least one of a radio frequency signal, an infra-red frequency signal, and an optical signal.

6. The method according to claim 1 further comprising:
   obtaining a geographic position of the vehicle with respect to a work area for the vehicle by estimating the time of arrival of electromagnetic signals from at least three passive beacons having corresponding unique beacon identifiers coded via said electromagnetic signals.

7. The method according to claim 6 wherein the electromagnetic signals comprise at least one of a radio frequency signal, an infra-red frequency signal, and an optical signal.

8. The method according to claim 1 wherein the guiding the vehicle further comprises:
   aiming a stereo vision sensor frontward in a direction of movement of the vehicle to view a stereo vision viewing zone;
   facing a first visual camera frontward in a direction of movement of the vehicle to overlap with the stereo viewing zone; and
   facing a second visual camera rearward and opposite the direction of movement of the vehicle.

9. The method according to claim 1 wherein detecting the presence of an obstacle comprises:
   transmitting an ultrasonic signal within a radius about the front of the vehicle;
   identifying an obstacle within the radius based on the reception of one or more reflections of the ultrasonic signal by an array of antenna elements mounted on the vehicle; and
   identifying an obstacle by using at least one of a proximity sensor and a contact sensor mounted about a periphery of the vehicle and any implement attached thereto.

10. The method according to claim 1 wherein the guiding of the vehicle further comprises:
    using a global positioning receiver with differential correction to determine a local position of the vehicle within a work area.

11. The method according to claim 1 wherein the path planning comprises selecting a series of substantially parallel rows within a work area, wherein at least one of the rows is generally parallel to an outer generally linear boundary of the work area.

12. The method according to claim 1 wherein the path planning comprises selecting a series of substantially parallel curved rows within a work area, wherein at least one of the curved rows is generally parallel to an outer generally curved boundary of the work area.

13. A system of controlling a vehicle comprising:
    a path planner for planning a path of a vehicle based on operator input;
    a vehicular guidance module for guiding the vehicle in a first mode based on the planned path; the vehicular guidance module facilitating operation of the vehicle in a second mode, distinct from the first mode, where an operator of the vehicle commands or activates at least one of a propulsion system, a braking system, a steering system, and an implement system of the vehicle; the vehicular guidance module adapted to guide the vehicle in a third mode based upon the planned path and the detection of the presence of the obstacle;
    a sensor for detecting the presence of an obstacle that obstructs the planned path of the vehicle if the vehicle is operating in a third mode, mutually exclusive to the first mode and the second mode; and
    a mode selector for selecting at least one of said first mode, second mode, and third mode based upon the operator input.

14. The system according to claim 13 wherein the first mode comprises an automatic steering mode, the second mode comprises a manual operator-driven mode, and the third mode comprises an autonomous mode.

15. The system according to claim 13 wherein the mode selector is arranged to automatically switch from the first mode to the second mode in response to the operator operating at least one of the propulsion system, the braking system, the steering system, and the implement system during the operation of the vehicle in the first mode.

16. The system according to claim 13 further comprising:
    a navigation system for obtaining a geographic position of the vehicle with respect to a work area for the vehicle by estimating the time of arrival of electromagnetic signals from at least three active beacons having corresponding unique beacon identifiers coded via said electromagnetic signals.

17. The system according to claim 16 wherein the electromagnetic signals comprise at least one of a radio frequency signal, an infra-red frequency signal, and an optical signal.

18. The system according to claim 13 further comprising:

a navigation system for obtaining a geographic position of the vehicle with respect to a work area for the vehicle by estimating the time of arrival of electromagnetic signals from at least three passive beacons having corresponding unique beacon identifiers coded via said electromagnetic signals.

19. The system according to claim 18 wherein the electromagnetic signals comprise at least one of a radio frequency signal, an infra-red frequency signal, and an optical signal.

20. The system according to claim 13 further comprising:

a stereo vision sensor aimed frontward in a direction of movement of the vehicle to view a stereo vision viewing zone;

a first visual camera facing frontward in a direction of movement of the vehicle to overlap with the stereo viewing zone; and a second visual camera facing rearward and opposite the direction of movement of the vehicle.

21. The system according to claim 13 wherein detecting the presence of an obstacle comprises:

transmitting an ultrasonic signal within a radius about the front of the vehicle;

identifying an obstacle within the radius based on the reception of one or more reflections of the ultrasonic signal by an array of antenna elements mounted on the vehicle; and identifying an obstacle by using at least one of a proximity sensor and a contact sensor mounted about a periphery of the vehicle and any implement attached thereto.

22. The system according to claim 13 wherein the guiding of the vehicle further comprises:

using a global positioning receiver with differential correction to determine a local position of the vehicle within a work area.

23. The system according to claim 13 wherein the path planning comprises selecting a series of substantially parallel rows within a work area, wherein at least one of the rows is generally parallel to an outer generally linear boundary of the work area.

24. The system according to claim 13 wherein the path planning comprises selecting a series of substantially parallel curved rows within a work area, wherein at least one of the curved rows is generally parallel to an outer generally curved boundary of the work area.

* * * * *